United States Patent [19]

Sarkar

[11] Patent Number: 5,558,693
[45] Date of Patent: Sep. 24, 1996

[54] METHODS OF MAKING OPTICAL WAVEGUIDES

[75] Inventor: Arnab Sarkar, West Hills, Calif.

[73] Assignee: SpecTran Communications Fiber Technologies, Inc., Sturbridge, Conn.

[21] Appl. No.: 319,394

[22] Filed: Oct. 6, 1994

Related U.S. Application Data

[62] Division of Ser. No. 2,077, Jan. 8, 1993, Pat. No. 5,364,430, which is a continuation of Ser. No. 722,969, Jun. 28, 1991, abandoned, which is a division of Ser. No. 308,986, Feb. 8, 1989, Pat. No. 5,028,246, which is a continuation of Ser. No. 825,444, Feb. 3, 1986, abandoned.

[51] Int. Cl.⁶ .................................................. C03B 37/08
[52] U.S. Cl. ........................... 65/382; 65/384; 65/392; 65/414; 65/415; 65/421; 65/427
[58] Field of Search ........................... 65/531, 382, 384, 65/381, 392, 414, 415, 421, 426, 427

[56] References Cited

U.S. PATENT DOCUMENTS

| | | | |
|---|---|---|---|
| 3,932,162 | 1/1976 | Blankenship et al. | 65/3.12 |
| 4,045,198 | 8/1977 | Rau et al. | 65/398 |
| 4,165,915 | 8/1979 | Rau et al. | 65/DIG. 16 |
| 4,224,046 | 9/1980 | Izawa et al. | 65/415 |
| 4,345,928 | 8/1982 | Kawachi et al. | 65/18.2 |
| 4,367,013 | 1/1983 | Guerder et al. | 65/3.12 |
| 4,367,085 | 1/1983 | Suto et al. | 65/3.12 |
| 4,372,648 | 2/1983 | Black | 65/3.12 |
| 4,378,985 | 4/1983 | Powers | 65/3.12 |
| 4,385,802 | 5/1983 | Blaszyk et al. | 385/127 |
| 4,421,539 | 12/1983 | Edahiro et al. | 65/18.2 |
| 4,428,762 | 1/1984 | Andrejco et al. | 65/3.12 |
| 4,465,708 | 8/1984 | Fanucci et al. | 427/423 |
| 4,493,720 | 1/1985 | Gauthier | 65/391 |
| 4,552,576 | 11/1985 | Hara et al. | 65/3.12 |
| 4,568,370 | 2/1986 | Powers | 65/3.11 |
| 4,608,070 | 8/1986 | Roba | 65/2 |
| 4,618,354 | 10/1986 | Suda et al. | 65/18.2 |
| 4,627,866 | 12/1986 | Kanamori et al. | 65/DIG. 16 |
| 4,629,485 | 12/1986 | Berkey | 65/398 |
| 4,639,079 | 1/1987 | Powers | 350/96.33 |
| 4,714,488 | 12/1987 | Powers | 65/13 |
| 4,715,875 | 12/1987 | Jacobson | 65/2 |
| 4,726,827 | 2/1988 | Powers | 65/3.12 |
| 4,729,777 | 3/1988 | Mimura et al. | 65/388 |
| 4,735,475 | 4/1988 | Watanabe et al. | 350/96.34 |
| 4,740,226 | 4/1988 | Toda | 65/532 |
| 4,902,325 | 2/1990 | Kyoto et al. | 65/3.12 |
| 4,979,971 | 12/1990 | Kyoto et al. | 65/DIG. 15 |
| 5,236,482 | 8/1993 | Danzuka et al. | 65/3.12 |

FOREIGN PATENT DOCUMENTS

| | | |
|---|---|---|
| 61-10037 | 1/1986 | Japan . |
| 2105488 | 3/1983 | United Kingdom . |

*Primary Examiner*—John M. Hoffmann
*Attorney, Agent, or Firm*—Pennie & Edmonds

[57] ABSTRACT

Low attenuation, low dispersion of optical waveguides are provided by a process initiating with axial deposition of a high velocity core soot stream impinging on, a target at a high angle of incidence relative to the axis of rotation of the target. A core cylinder is built up axially by relative movement between the soot stream and target during deposition, the movement being non-constant in order to maintain a substantially constant diameter with a constant deposition rate. A cladding layer is then built up by deposition of soot radially on the core. Subsequent drying and sintering provides a vitreous preform which may be drawn directly into optical waveguides. Alternatively, the sintered product may be drawn down to smaller rods, which then are covered with further deposited soot cladding to a desired final thickness, and after further drying and sintering may be drawn to optical waveguides.

27 Claims, 5 Drawing Sheets

METHODS OF MAKING OPTICAL WAVEGUIDES

CROSS-REFERENCE TO RELATED APPLICATIONS

This application is a division of application Ser. No. 08/002,077 filed Jan. 8, 1993, now U.S. Pat. No. 5,364,430, which was a continuation of application Ser. No. 07/722,969 filed Jun. 28, 1991, now abandoned, which was a division of application Ser. No. 07/308,986, filed Feb. 8, 1989, now U.S. Pat. No. 5,028,246, which was a continuation of application Ser. No. 06/825,444, filed Feb. 3, 1986, now abandoned.

BACKGROUND OF THE INVENTION

This invention relates to methods of making optical waveguides and optical waveguide preforms and products, and more particularly to providing such products by vapor deposition techniques.

The most commonly used techniques for optical waveguide manufacture at present are based on dissociation in a flame of glass forming constituents to build up a porous preform of vitreous particles called "soot". The "soot" preform is converted to a glassy state by sintering at an elevated temperature. A desired combination of core and cladding layers is drawn under temperature and tension to its desired final diameter. As the usage of optical waveguides has increased, the technical requirements for communications systems have also become more demanding. In the current state of the art signal attenuation of 0.4 dB per kilometer, low dispersion, and precise cut-off wavelength characteristics are often sought. These factors dictate that, in addition to very low impurities and a homogeneous microbubble-free structure, there must also be reliable and predictable control of the refractive index profile as defined by the core and cladding geometries and materials. In addition, of course, since the economics of any process used are of great importance, basic costs and yields must both be at satisfactory levels.

In consequence of such factors, processes heretofore used are now less than satisfactory from one or more standpoints. An early widely used process was so-called "inside vapor deposition," also known as the modified chemical deposition process, in which a core soot was deposited on the interior of a specially prepared silica tube, and the body was after vitrification collapsed down to fill the interior prior to or during drawing. The hollow silica tube is costly to prepare and restricts the preform size that can be made using this process. Other widely used alternatives now include an outside vapor deposition process, which is a radial deposition technique. The outside deposition process requires deposition on a mandrel and subsequent removal of the mandrel prior to sintering. This operation is sensitive and imposes a length restriction on the preform. In about 1977 a vapor-phase axial deposition process was devised for continuous soot deposition and preform manufacture. This method is described in Vol. 1, page 97 et seq., of the book *Optical Fiber Communications*, entitled "Fiber Fabrication," edited by Tingye Li, and published (1985) by the Academic Press, Inc. It is characterized by directing a soot stream toward the central vertical axis of a rotating target and providing relative axial movement between the stream and target as a solid cylinder of material is deposited. This solid cylinder in the VAD process can be continuously sintered, if desired, to provide a glass start rod, or cladding soot can be concurrently deposited by synchronously traversing the outer diameter of the cylinder with a soot stream impacting in a radial direction. The theoretical process advantages derivable from this approach are inhibited by a number of practical factors and technical limitations. The upwardly directed axial soot stream must be diverted away from the sides of the deposited cylinder to prevent side deposition, and for this purpose secondary air flows and special exhaust configurations must used, along with precise burner control. Moreover, when radial deposition is to be used concurrently, it is difficult to synchronize the radial buildup rate with the axial buildup rate, which is not uniform due to instabilities in the chamber. Also, with both burners in the same chamber there is inevitable mixing of the soot streams and a diffuse interface between the core and cladding.

There are, in addition, certain fundamental limitations on the VAD process as now practiced. As described in the referenced article, and in U.S. Pat. No. 4,224,046, the initial thinking was that the soot stream should be coaxial ($\theta=0°$) as well as vertical. Subsequent workers proposed (see U.S. Pat. No. 4,367,085) that the deposited cylinder be rotated about a vertical axis but that the angle of impingement should be about $\theta=40°$, with an absolute maximum angle for growth of 60°. Further, laminar flow of the soot stream, with Reynolds numbers less than about 100, has been considered to be necessary for deposition control published data indicates that the fine glass particle deposition rate drops off at Reynolds numbers above 30–50 and decreases substantially above 80. With these operative limitations, it is not feasible substantially to increase the deposition rate and thereby reduce costs.

Where synchronized axial and radial deposition of core and cladding are used along with an outer sleeving to provide additional cladding, other cost and performance barriers are also encountered. The cladding thickness (t) to core radius (a) ratio has both operative and economic significance. A high t/a ratio can mean lower losses, in accordance with published data, but the initial layers are the most costly to form and the penalty of incurring inordinate costs in the formation of core or cladding is not acceptable. Further, it is necessary to restrict hydroxyl ion content to keep losses low, because OH ions, introduced at interfaces or during processing, are representative of $H_2O$ content, which is directly proportional to absorption. Nonetheless, most manufacturers using the VAD process build a core and cladding structure of limited t/a ratio of $\geq 7$ and combine this with a low hydroxyl ion sleeving tube. High costs are involved both in the soot-deposited portion, which is limited in rate and size, and in the incorporation of sleeving, which must be specially prepared. Elimination of these limitations is highly desirable..

It is also known to use a redeposition or "hybrid" process, as discussed in U.S. Pat. No. 4,378,985, for a graded index fiber. In this process the outer cladding is formed by an added soot layer. This approach is subject to the problems of synchronization mentioned above, as between axial and radial deposition.

Consequently, while there has been a constant evolution, in optical waveguide technology, of product properties and performance, subtle and complex interrelationships inhibit further improvements. In addition to those mentioned, signal propagation properties are substantially affected by the shape of the refractive index profile. For single mode propagation, widely used because of its bandwidth potential, the core/cladding ratio needs to be accurately controlled and the interface should provide a predictable "quasi-step" characteristic. The VAD process used with simultaneous soot deposition cannot consistently provide the above characteristics, and consequently there can be large variation of cut-off wavelength and inferior dispersion characteristics. Also, hydroxyl ion migration in the sleeving operation requires use of a large t/a ratio to control hydroxyl content in the fiber. Consequently, the process is expensive and the properties of the resulting fibers are marginal.

SUMMARY OF THE INVENTION

Processes in accordance with the invention incorporate axial deposition of core material using a high velocity laminar soot stream at an angle greater than 60° to a horizontally rotating initial target, to build up a uniform diameter core cylinder. Then pass-by-pass radial deposition of cladding is used until a large preform body having a given t/a ratio is obtained. This body may be large enough to be drawn directly into optical waveguides after drying and sintering, on the initial body may be dried, sintered, drawn down, built up with additional cladding soot, vitrified and then drawn to final dimension.

In one form, the core may have a higher refractive index than a pure silica cladding. In another example in accordance with the invention, however, the cladding may be fluorinated during sintering to lower the refractive index below that of a pure silica core. Preforms can be fabricated that have large diameters and high mass, so that an extremely long optical waveguide can be drawn from bodies formed with high deposition rates and low costs. In addition, the diameter of the core is adequately closely controlled, and the sequentially and radially deposited cladding does not vary in thickness along its length. Boil off of refractive index modifiers from the core soot layer is minimized by lowering the burner temperature when initially depositing cladding. Thereafter density is kept substantially constant by increasing burner temperature in accordance with surface velocity.

In a more specific example of a method in accordance with the invention, a small pure silica starter element is rotated about a horizontal axis as a flame hydrolysis burner directs a soot stream of core material upwardly against the starter element at an angle greater than 60° to the axis and at a velocity such that the Reynolds number is in the range of 100 or above. Excess particle matter is exhausted to a vertically separated outtake along the path of the impinging soot stream. The burner and soot stream are held along the central axis as the target and forming core cylinder are initially reciprocated to form a bulbous soot tip. The soot tip is then withdrawn-at a rate that is controlled by sensing the position of the end of the cylinder and modulating the withdrawal mechanism on and off to maintain a substantially constant growth rate. The result is a substantially constant diameter core, about 2.5 cm in this example. When a predetermined length of core soot rod, e.g. 35 cm, has been built up, a soot cladding layer is separately added by radial deposition to a thickness at least twice the core radius. The soot core cylinder is rotated and also reciprocated back and forth above the cladding burner to build the cladding to the needed radial thickness. This sequence eliminates the need for synchronization of radial deposition with axial deposition and provides a low hydroxyl ion, void free, soot-soot interface. Both deposition steps are cost efficient and carried out at high rates. The chosen thickness of core and cladding is then dried, consolidated by sintering, and drawn and cut to form intermediate rods of greater than $\frac{1}{10}$th the diameter of the consolidated composite rod. These rods then receive additional cladding to the total thickness needed to establish, after another consolidation, the needed cutoff wavelength characteristics in the final drawn optical waveguide. In the case of 125 micron diameter waveguides, for example, the core is typically 9 microns and the remainder is cladding.

The relationships of the soot stream angle and impingement area to the developing soot core cylinder, as well as other parameters, are of importance to achieving high growth rate, uniform density and constant diameter. The soot stream is of substantially uniform cross-section and it is directed along an axis displaced in two orthogonal directions from the geometric center of the core cylinder. Soot rapidly deposited on the end of the core cylinder defines ablunt slightly convex end on the cylinder that is of uniform shape as the core cylinder builds. Furthermore the core cylinder is of substantially uniform density throughout its radius and its length.

In one alternative process the axially deposited core is small, such as 1 cm in diameter, and the cladding layer is comparably larger, around 13 cm in thickness. Using a large furnace, drying and sintering provides a glass preform which can be drawn directly to a single mode optical waveguide of desired characteristics. In another alternative process the operating parameters are varied during core deposition to provide gradient index, multi-mode fibers.

In accordance with a different method, a silica core rod is deposited by the high velocity, high angle of incidence, technique, then dried and sintered. A silica cladding layer is deposited to a desired depth, but consolidation is conducted in the presence of a fluorinating agent, which diffuses into the cladding only to lower the refractive index the desired amount. Fluorosilicate fibers of as low as 0.2 dB/km attenuation at 1.55 microns wavelength have been fabricated in this manner.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
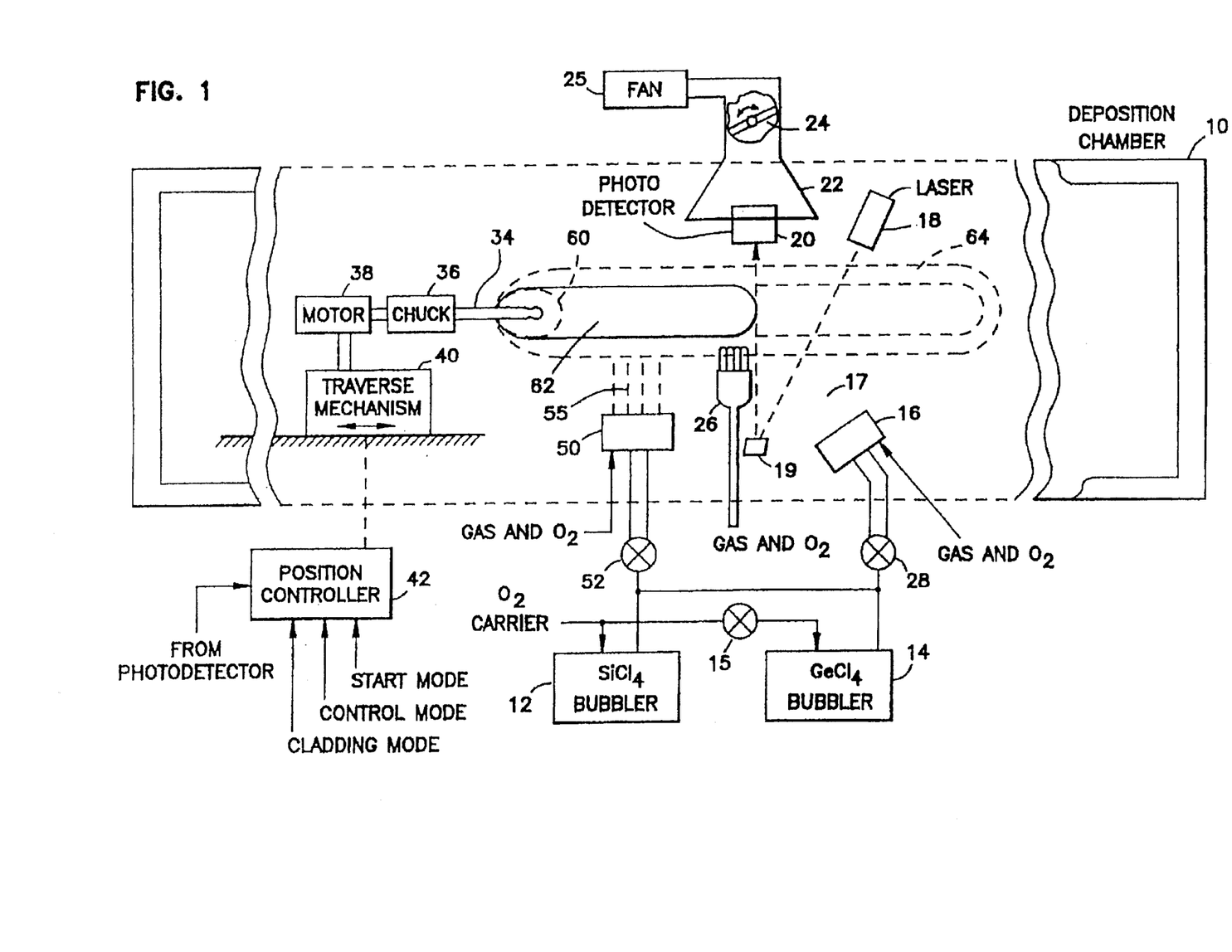
FIG. 1 is a combined simplified perspective and block diagram view of a system in accordance with the invention for fabricating optical waveguide preforms.

Most of the operative elements of a system in accordance with the invention, referring now to FIG. 1, are mounted within a large enclosed deposition chamber 10. A first bubbler 12, which may be inside or outside the chamber 10, contains purified precursor materials such as a silica compound, here $SiCl_4$. Silica glass precursor vapors are forced out of the first bubbler 12, by directing a carrier gas, specifically oxygen or another suitable medium, under pressure into the bubbler 12. Also included is a second bubbler 14 containing purified precursor dopant materials, here specifically a germania compound, $GeCl_4$. Dopant precursor vapors are also forced out of the second bubbler 14 by the $O_2$ carrier. A valve 15 in the $O_2$ carrier line can be operated to shut off the second bubbler 14 when desired. The entrained glass forming compounds in the vapor stream are mixed and are dissociated, in known fashion, upon being fed into a first burner 16 held, in this example, in substantially fixed position relative to the deposition zone. The first burner 16 generates a streamlined soot stream 17 that is directed upwardly, at an angle of inclination of 65° relative to a horizontal rotation axis. A narrow light beam from a laser 18 is directed off a mirror 19 and onto a photodetector 20. The beam of the mirror 19 is angled to intercept the axis at the geometric center of the deposited material, as described later. The soot stream 17 is, however, not centered on the geometric center but is offset both vertically and laterally by predetermined amounts, discussed in greater detail below. The light beams can be positioned to intercept the central axis at any angle relative to the horizontal or vertical directions that is free of interference from associated equipment, being shown angled off the vertical only for clarity. The chemical components in the soot stream 17 are at a velocity of 40 ft/sec., while other gases are at about 25 ft/sec. An exhaust outtake 22 immediately above the target area collects gases and non-impinging particulates at a gas flow rate of approximately 300 ft/min, as preset by a butterfly valve 24 in the exhaust system path to a fan 25. An end burner 26 adjacent the first burner 16 aids in bringing the temperature at the point of deposition up to a given level before deposition begins. A valve 28 can be turned on or off to control usage of the first burner 16.

Within the deposition chamber 10 a relatively short length of silica bait rod 34 is centered along the reference axis on a chuck 36. The chuck 36 and bait rod 34 are rotated at a selected rate of 10 r.p.m., for core deposition, by a rotary drive 38 mounted on a linear traverse mechanism 40. A position controller 42 receiving signals from the photodetector 20 in the core deposition mode can run the traverse mechanism 40 unidirectionally, and at a desired rate. The traverse mechanism 40 can be made to reciprocate through any chosen length of travel at a desired rate by bypassing the position controller 42. In the core deposition mode the bait rod 34 is first reciprocated through a short distance, and thereafter moved unidirectionally under position control. The traverse mechanism 40 can also reciprocate through a substantial total length, here about 40 cm, for deposition of cladding.

A second burner 50 within the deposition chamber 10 is spaced along the reference axis from the bait rod 34 and separately used for depositing cladding. The second burner 50 is fed from the first bubbler 12, when a valve 52 is open, with a particulate forming compound, here pure silica, by the $O_2$ carrier gas. A second soot stream 55 is generated at a later time that is pointed perpendicularly to the horizontal reference axis.

Formation of a core cylinder or start rod for an optical waveguide preform is a substantial departure from prior VAD techniques. The deposition chamber 10 is first cleaned, and the bait rod 34 is mounted in the chuck 36, and centeredon the axis of rotation. The first burner 16 is positioned with respect to the laser beam that defines the tip of the deposited material during position control. The first burner 16 is then lit, the exhaust velocity being maintained, and conditions are allowed to stabilize before the bait rod 34 is rotated at about 20 r.p.m. by the drive 38, and advanced into the path of the first soot stream 17 containing core particulates. The soot stream 17 impinges at its high angle of incidence on and about the leading end of the bait rod 34, which is oscillated back and forth at a rate of about 45 cm/hr. A bulbous starter tip 0 develops over the free end of the bait rod 34, to a length of approximately 2 cm. When sufficient material has been deposited, this bulbous tip 60 forms an adequate base or anchor for development of a soot core cylinder 62.

Axial development of the soot core cylinder 62 commences with the position controller 42 initially providing a fixed withdrawal rate of 12 cm/hr. The first soot stream 17 sprays the end of the bulbous starter tip 60, initializing the core cylinder 62. With the chemical constituents of the soot stream at a velocity of 40 ft/sec and the ocher gases having ia velocity of 25 ft/sec the flow in the stream 17 is laminar, the Reynolds number is approximately 1000 and the deposition rate is approximately 0.14 grams per minute. The high flow rate in an upward direction is accompanied by some overspray, but the gases that bypass the core cylinder 62 are exhausted through the outtake 22, aided by the natural convective tendency of the hot gases to rise. As deposition of the core cylinder 62 begins, the withdrawal rate of 12 cm/hr. is slightly faster than the cylinder 62 growth rate, but enables growth to be equilibrated on the bulbous starter tip 60. The position controller 42 is then switched to the servo mode, with the laser beam intercepting the geometric center of the free end of the core cylinder 62.. The position controller 42 responds to the signals from the photodetector 20 by withdrawing the core cylinder 62 so as to maintain its free end in a constant position as matter is deposited. This establishes a non-constant withdrawal rate of between 6 and 8 cm/hr., to give a preform about 2.5 cm in diameter.

The core cylinder 62 continues to grow and be withdrawn by the traverse mechanism 40 until a total length in excess of 20 cm (usually in the 20–30 cm range) is achieved. This discontinuous operation enables better overall control, because it is carried out without intermixing of particulates of gases and without need for synchronization of steps.

With the desired length of core cylinder 62 developed, the first burner 16 is turned off, and the second burner 50 is ignited and allowed to stabilize. The traverse mechanism 40 is then actuated to reciprocate the length of the core cylinder 62 in opposition to the second burner 50. With the core cylinder 62 being turned at 20 r.p.m. by the rotary drive 38, the second burner 50 is held at a substantially constant distance of amount 17.5 cm from the axis of rotation of the core cylinder 62. The cylinder 62 is then traversed back and forth along the horizontal axis relative to the second, cladding, soot stream 55 by movement of the traverse mechanism 40 at a rate of about 250 cm/hr. Deposition of a pure silica soot particulate takes place at an average rate of approximately 2.5 grams per minute derived by flame hydrolysis of the carrier borne vapor from the first bubbler 12. The deposition temperature at the surface of the core cylinder 62 is gradually raised to a normal operating level by incrementally increasing the gas/oxygen flow rates over the first fifteen minutes of operation, until a thin contact layer of approximately 5 mm has been deposited on the core cylinder 62. The resultant lower temperatures avoid boiloff of germania from within the soot core cylinder 62, but the initially deposited cladding particulate nonetheless firmly unites to the surface of the core soot. The cladding also completely conforms to variations in the core cylinder 62 surface, which appear as surface waviness along the length inasmuch as diameter cannot be held exactly constant. Thus the interface between the core cylinder 62 and a fully developed outside cladding layer 64 is in the nature of a very thin transitional layer of substantially constant characteristics and very low moisture content, factors which are of substantial significance to the refractive index profile and hydroxyl ion content of the ultimate optical waveguide.

Deposition of cladding layer 65 is continued until a final diameter of approximately 10.5 cm is obtained, giving a ratio of cladding thickness (t) to core radius (a) of 2:1 or greater in this example. This soot preform has a mass of approximately 550 grams for a 35 cm length, and is free of internal discontinuities. As cladding is added the surface velocity increases, although the rate of increase slows as the radius becomes larger. The burner temperature is increased in steps with time to correspond generally to surface velocity, so as to maintain density substantially constant.

Figure 2:
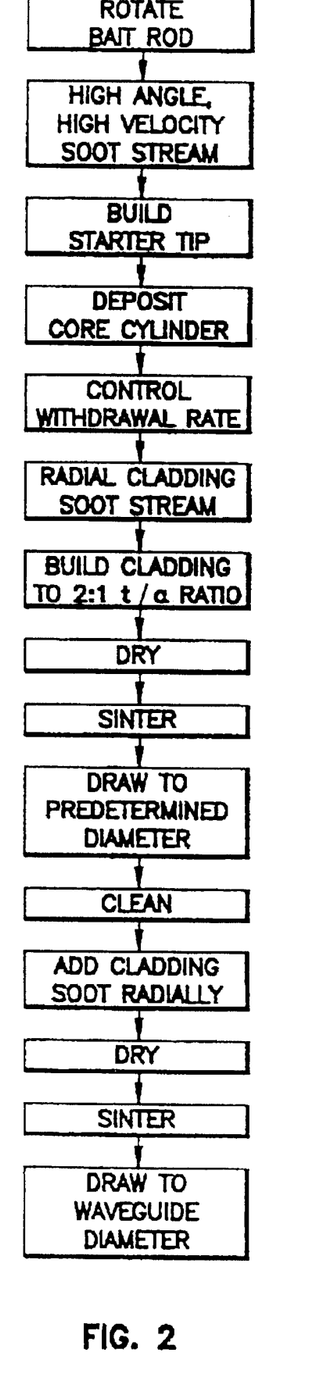
FIG. 2 is a block diagram of steps in a method for fabricating optical waveguide in accordance with the present invention.

Referring to the process steps shown in FIG. 2, the soot preform is first dried in a hydrophilic (here chlorine) atmosphere at 1150° C., and then sintered into a clear glass rod preform of approximately 3.8 cm diameter in a chlorine atmosphere at 1450° C.

The glass rod preform is then drawn down, in a substantially water-free furnace environment at 2000°, to approximately 9 mm diameter start rods. These glassy rods are 1/10th or more of the diameter of the dried and sintered product. The start rods provide a total length of usable rod of the order of 150 cm, usually separated into 40–50 cm lengths. The rods are inspected for refractive index profile, clad to core diameter ratio and glass quality. Handles are attached to the ends of those individual rods having suitable characteristics, and their exteriors are cleaned. Where the t/a ratio is about 2 or greater, they are fire polished by reciprocation and rotation in an oxygen flame to provide clean surfaces for the addition of further cladding. Where t/a ratio is about 1 they may be cleaned by dry etching.

In a second cladding step, the preliminary glass preform rods are again rotated and reciprocated in front of the second burner 50, to deposit a further cladding soot layer of 11 cm thickness on the drawn rod. When built up to the suitable diameter, the redeposited rod is then dried and sintered as before to provide a final fiber preform of approximately 5.5 cm in diameter. Such preforms are themselves commercial products because many manufacturers prefer to draw their own optical waveguides. To form optical waveguide, the preform rods are drawn, in conventional fashion, to a final fiber diameter of 125 microns for operation at 1300 nm wavelength. These optical waveguide fibers, with silica-germania cores and silica cladding, are single mode fibers having a t/a ratio of about 13, and attenuation of less than 1.0 dB/km, more typically 0.4 dB/km, and dispersion of less than 3.5 ps/nm/km in the wavelength range between 1285–1330 nm.

Obtaining a combination of high growth rate, uniform soot deposition and controlled diameter with a high velocity, high angle of incidence soot stream, entails consideration of a number of complex factors.

Figure 3:
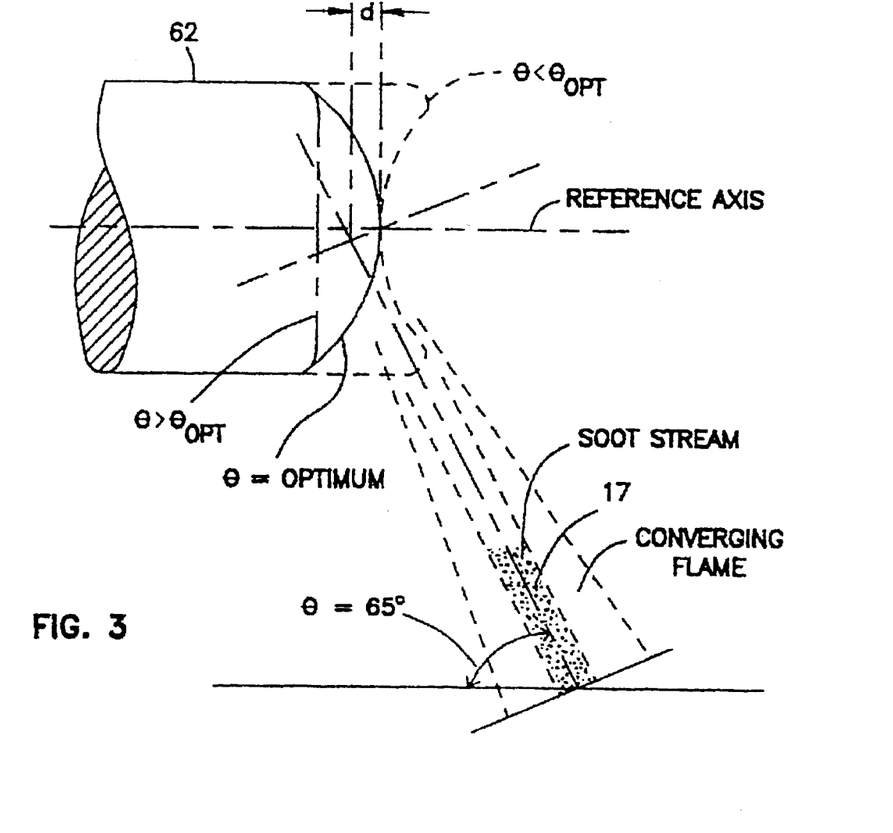
FIG. 3 is a side view of the soot stream and the end of a core cylinder in the system of FIG. 1, showing the impingement angle and how the deposited material changes in shape relative to impingement angle.
Figure 4:
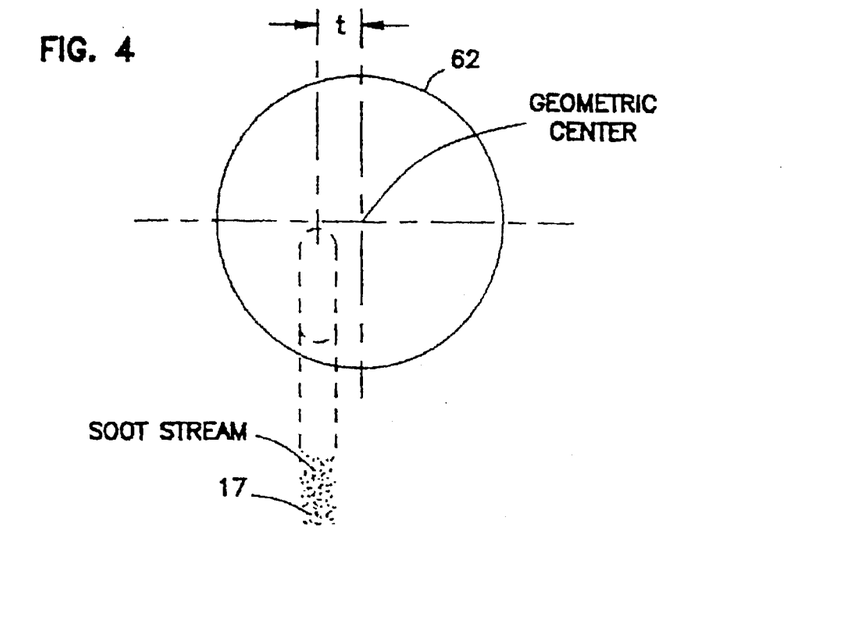
FIG. 4 is an end view of the soot stream and the end of a core cylinder, showing further details as to the impingement region.

The ideal core cylinder 62, referring now to FIGS. 3 and 4, preferably has a slightly convex end and a substantially constant diameter D. The geometric center of the leading edge of the core cylinder 62 is the target point for the laser beam used in measuring cylinder growth. Although this is the point of symmetry, and the instinctive approach would be to seek to obtain symmetry, core deposition in accordance with the invention instead offsets the center of the chemical stream both axially along the reference axis from the geometric center, as seen in FIG. 3, and laterally, as seen in FIG. 4. Overspray from the soot stream 17 is not shown for clarity, but the flow patterns at and after the target area are of importance. Along the upward path of the soot after the direct impingement area, the flow follows the contour of the convex end of the core cylinder 62 for a distance before being drawn up toward the exhaust outtake 22. This flow also diverges somewhat beginning at the impingement area. Deposition takes place along this arc that is contiguous to soot flow, being greater somewhat downstream where temperatures are less than at the direct impingement area.

The soot stream 17 is centered on a point on the reference axis that is spaced by a distance d inwardly on the core cylinder 62 from the leading edge face and geometric center. This means, as seen in FIGS. 3 and 4, that the actual center of the soot stream is below the reference axis. The spacing between the source of the soot stream 17 and a perpendicular line intercepting the geometric center is 4.875" (13.4 cm). Optimum growth rate is found when the inward distance d along the reference axis between the geometric center on the core cylinder face and the intersection of the stream 17 center with the reference is 1/8" (0.313 cm). If the center of the soot stream 17 is directed at the same angle but toward the geometric center, the shape is quite similar but the growth rate is negligible. If the angle is the same but the distance d is too great, then the core cylinder can have a soft outside layer and develop cracks as well as having a degraded refractive index profile.

The shape of the free end of the core cylinder 62 is slightly convex, as shown in FIG. 3, for the optimum included angle, here 65°, between the center of the soot stream and a line parallel to the axis of rotation. If the angle is less than the optimum, the shape of the tip is concave as shown by the dotted line and the growth rate decreases drastically. If the angle is greater than the optimum the cylinder 62 end tends to be flat, as shown by the dot-dash line and diameter and the growth rate falls substantially.

Figure 5:
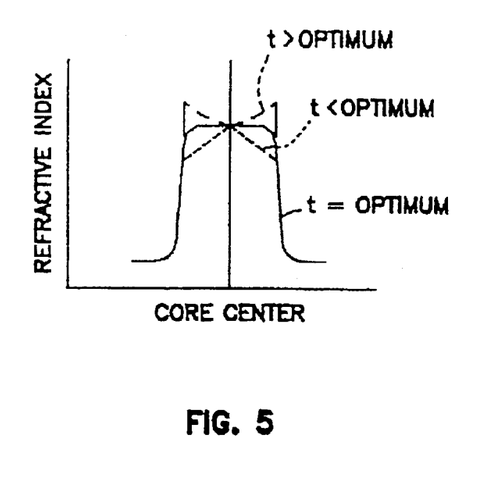
FIG. 5 is a graphical representation of changes in core cylinder profile with axial offset of the impingement position.

Also, as seen especially in FIG. 4, the density distribution and refractive profile of the core cylinder 62 are further controlled by a lateral offset (t) of the center of the soot stream 17 relative to the geometric center of the core cylinder 62. For the present example and conditions, the distance t is found to be optimum at 0.35 cm (0.138"). As seen in FIG. 5, when t is optimum the refractive index profile has steep sides at the edges of the core and a substantially constant value through the core. If the value of t is less than the optimum value, the refractive index value falls off on both sides of the core center (dot-dash line), whereas if t is greater than the optimum value (dotted line) the refractive index profile shows higher values near the core edges. Neither condition is acceptable if the deviations are substantial.

Under the stated conditions of soot stream spacing, and the gas flow velocities for the chemical constituents and other gases, and using servo control of the withdrawal rate, the present system provides a substantially constant core development at a deposition rate of approximately 0.14 grams per minute. The Reynolds number is approximately 1000, but in any event substantially greater than 80, the flow in the soot stream being laminar. Thus a core and a start rod of high quality are concurrently formed so that a body can be provided having a soot/soot interface between core and cladding. This process has substantial economic advantages over prior techniques in which a high quality silica substrate tube or sleeving tube must be utilized at substantial cost penalty. The process in accordance with the invention, and preforms and waveguides provided thereby, also affords substantial benefits in terms of the optical properties of the resultant waveguides.

Figure 6:
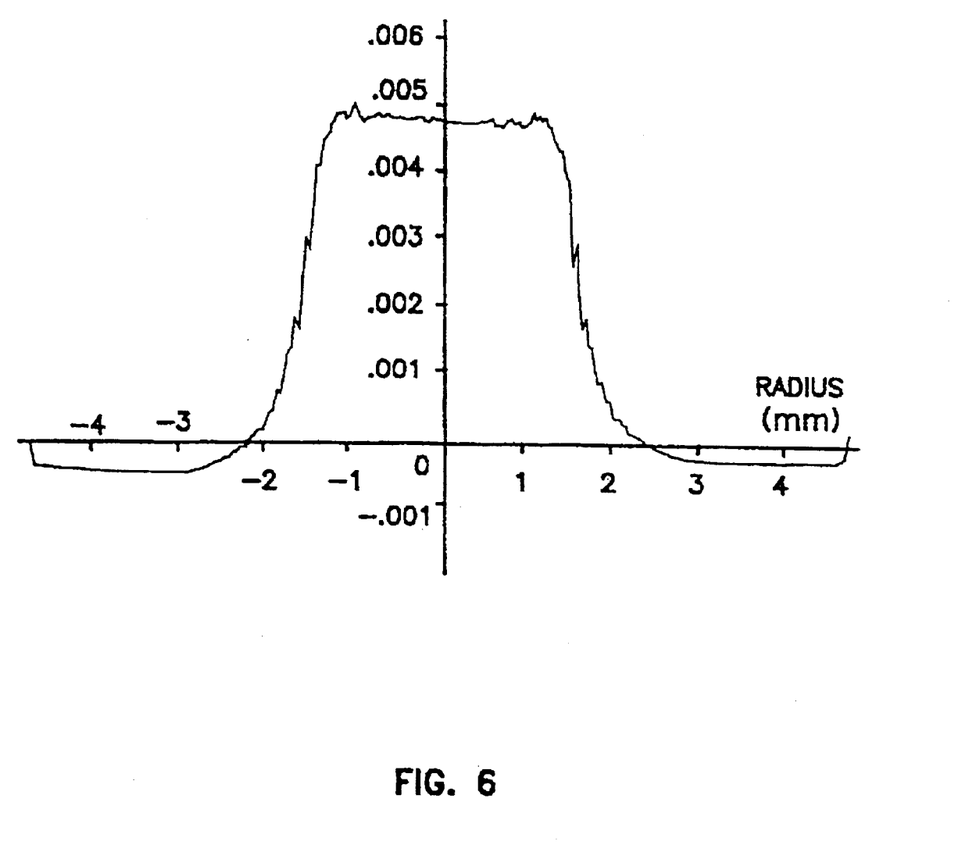
FIG. 6 is a graph of the refractive index profile of an optical waveguide in accordance with the invention.

The refractive index profile, shown in FIG. 6, aids in understanding the reasons for superior optical properties. The high refractive index in the core section and the lower index in the cladding section provide comparative values and are not indexed to zero. The sawtooth excursions are due to instrumental instabilities encountered at 20 micron step readings. The character of the transition line between the high and low levels is crucial to obtaining the "quasi-step" profile needed for single mode fiber characteristics, it being inherent that an infinite (i.e. vertical) slope is not feasible with this type of process. However, as seen in FIG. 6 the slope of the transition line is steep and free from substantial perturbations both at the base and the peak. The transition slope line is not precisely vertical because of the minor dimensional variations in the core arising from the deposition process.

Figure 7:
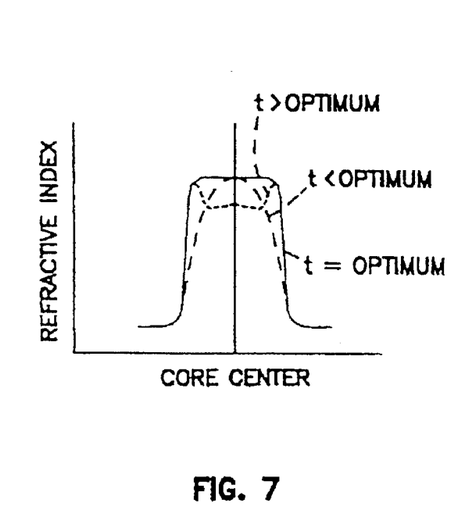
FIG. 7 is a graph of raviations in refractive index profile as a function of temperature for optical waveguides in accordance with the invention.

During core deposition control of temperature is critical for control of refractive index profile. The effect of temperature on profile is shown in FIG. 7. If the temperature is below the optimum, then the profile (dotted line curve) has side slopes of too great an angle to the vertical and a peak refractive index only at the core center. If the temperature is above the desired level, then the refractive index in the intermediate core region is depressed, even though the outer core surface is of higher index and the side slopes are adequately vertical. A corollary of this temperature dependence, however, is that a graded index fiber can be provided by using temperatures that are less than those required for constant refractive index through the core. In this variant, moreover, the soot stream position relative to the free end of the core cylinder and the chemical soot stream constituents may also be different during deposition. Thus the soot stream would typically impinge closer to the core cylinder center and the amount of germania would typically be increased.

Figure 8:
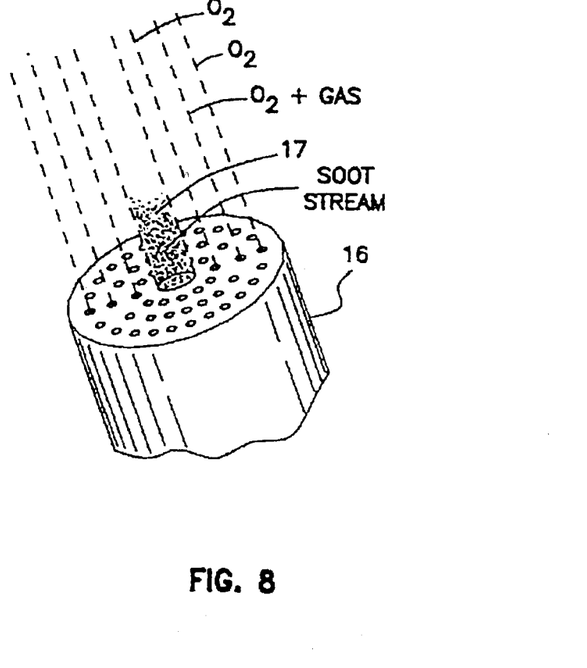
FIG. 8 is an enlarged side view of a burner and soot stream configuration used in core cylinder deposition.

The burner 16 used for core deposition is shown, along with the relative geometries of the gas streams, in FIG. 8. The chemical soot stream 17 emanates from a central aperture 70 around which an inner ring of orifices 72 provides an inner shield of oxygen flow. An intermediate ring of flammable gas and oxygen orifices 74 provides a circular flame that converges slightly. A final outer shield of oxygen emanates from orifices 6 in an outer ring. This arrangement maintains the chemical soot stream with a substantially constant diameter which provides the needed flame for disassociation.

Figure 9:
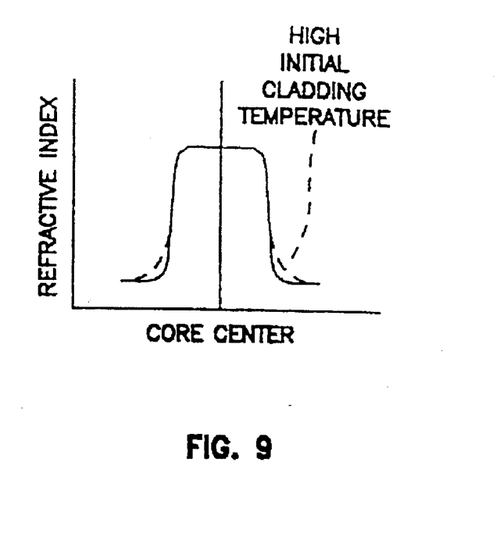
FIG. 9 is a graphical representation of refractive index profile variations with cladding temperature variations.

As seen in FIG. 9, the base level transition between the cladding and the steep slope at the core interface are made much more gradual (dotted lines) where initial cladding deposition temperatures are higher. The germania dopant in the core is thought to boil off and perhaps shrink the core if a thin interface of cladding is not deposited at lower than normal deposition temperature, at a small sacrifice in process time.

One advantage of the present process in accordance with the invention is that a complete soot/soot preform can be fabricated, sintered and drawn directly into an optical waveguide. For this purpose, the soot stream moves closer to the core cylinder so that the core cylinder is developed only to a diameter of about 1 cm. Thereafter, a cladding is deposited up to about 14 cm, for the desired overall t/a ratio, and the composite core/cladding structure is then dried and sintered, following which it is of approximately 7 cm diameter and can be drawn directly down to optical waveguide dimensions.

Figure 10:
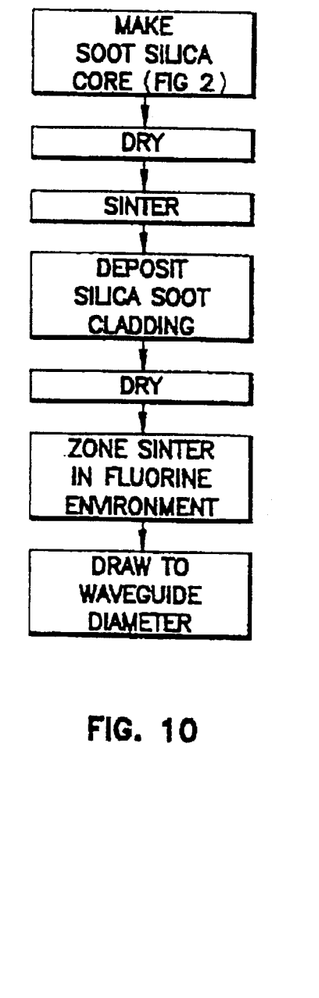
FIG. 10 is a block diagram of steps in a method of forming another type of optical waveguide in accordance with the invention.

It will be appreciated, further, that a number of alternatives can be employed at different stages in the process. The angle between the core soot stream and the rotary axis of the core cylinder can be kept the same, but the reference axis can be tilted relative to the horizontal, and the soot stream directed more nearly vertical, or purely vertical, with the exhaust outtake being reconfigured if needed to provide clearance about the core cylinder while providing the function of extracting overspray. The vitrified rods can be cleaned in a variety of ways, including dry gas etching and high intensity laser beam polishing as well as fire polishing. In another process in accordance with the invention, referring now to FIG. 10, optical waveguides of even lower attenuation (0.2 dB/km) are provided by using a pure silica core and a cladding of a lower index of refraction. In the first step, a pure silica soot core is deposited, as in the example of FIG. 2. This body is then dried and sintered, and a cladding, also of silica soot, is deposited thereon to a desired thickness. This soot layer is then dried at 1150° C. in a hydrophilic atmosphere. Subsequently, it is zone sintered in a fluorinating atmosphere (using $SF_6$) to permeate the soot with a desired fluorine content concurrently with consolidation. Subsequently, another layer of silica soot may be added, and thereafter dried and sintered to provide the desired total cladding thickness.

The drying and sintering steps are carried out in a closed furnace into which gas flows are injected at controlled rates as the body is held at a controlled temperature. For drying, the furnace is heated to the range of 1000°–1150° C. over 20 minutes with a chlorine flow of 350 sccm, helium flow of 7000 sccm and oxygen flow of 140 sccm, then held for 30 minutes at 1150° C. under the same conditions. After this time, the preform is withdrawn, with the same flows maintained, the withdrawal being effected within 10 minutes.

The sintering step is conducted with a lesser drying flow of chlorine of 50 sccm, a constant helium flow of 7000 sccm and a flow of sulfur hexochloride of 135 sccm, starting with a 40 minute heat up phase increasing the temperature from 1200° to 1450° C. The preform is then sintered for 180 minutes at 1450° C., with the flows maintained constant and with the preform being advanced through the hot zone at 0.2 cm/min. Thereafter the flows are discontinued and the preform is cooled down from 1450° to 1000° C. in a 30 minute period.

While there have been described above and illustrated in the drawings various forms and modifications in accordance with the invention, it will be appreciated that the invention is not limited thereto but encompasses all expedients and variants within the scope of the appended claims.

What is claimed is:

1. A method of making a proform for optical waveguides comprising the steps of:

a) forming a core cylinder onto a rotating bait rod the core cylinder having a longitudinal axis, a free end positioned away from said bait rod and a substantially constant radius "a" by; (1) directing core soot stream onto the free end of the core cylinder to deposit core soot material thereupon; and (2) modifying the position of the core soot stream relative to the core cylinder to maintain a controllable deposition rate of said core soot material on the core; wherein the core soot stream has a cross-section substantially uniform along its path and a Reynolds number greater than about 100;

b) depositing a first cladding material layer on an outer surface of the core cylinder using a radial cladding soot stream by reciprocating the core cylinder along the longitudinal axis of the core cylinder until the cladding ratio "t/a" reaches a predetermined value between about 1 and about 26, where "t" is the thickness of the first cladding material layer; and c) drying and sintering the article formed in step (b) to provide a vitreous proform capable of being drawn into an optical waveguide.

2. The method of claim 1 further comprising the steps of drawing the vitreous preform to a predetermined diameter; depositing radially a second cladding material layer of a predetermined thickness onto said first cladding material layer; and sintering and drawing the product thus formed into a waveguide having a predetermined diameter.

3. The method of claim 1 wherein the modifying comprises changing the distance "d" between the geometric center of the free end of the core and a point which is defined as an intersection of the center of the core soot stream with the longitudinal axis of the core cylinder.

4. The method of claim 1 wherein the distance "d" between the geometric center of the free end of the core and a point which is defined as an intersection of the center of the core soot stream with the longitudinal axis of the core rod is about 0.3 cm.

5. The method of claim 4 wherein the deposition rate is at least about 0.1 grams per minute.

6. The method of claim 1 wherein the axis of rotation of the bait rod is substantially horizontal and the core soot stream is directed upward at an angle of at least about 60° to the axis of rotation and excess core soot material is exhausted.

7. The method of claim 1 wherein step (a) further comprises the steps of sensing the position of the free end of the core cylinder; and said modifying further comprises moving the core cylinder in a direction away from the soot stream to maintain the core soot deposition rate substantially constant.

8. The method of claim 1 wherein the core soot stream has a first predetermined velocity and is encompassed by a gas stream having a second predetermined velocity lower than the first velocity, the encompassing gas stream converging as to provide the core soot stream with a substantially uniform cross-section along the path of the core soot stream up to a location where the core soot stream impinges on the free end of the core cylinder.

9. The method of claim 8 wherein the first velocity is about 40 feet/sec and the second velocity is about 25 feet/sec.

10. A method of fabricating a preform having a predetermined refractive index profile comprising the steps of:

a) forming onto a rotating bait rod a core, the core having a longitudinal axis, a first end attached to said bait rod, a free end, a substantially constant radius "a" and a predetermined refractive index profile by: (1) directing a confined core soot stream with a cross-section substantially uniform along its path and a Reynolds number greater than about 100 onto the free end of the core to deposit core soot material thereupon; and (2) modifying the position of the core soot stream relative to the core to maintain a controllable deposition rate;

wherein the predetermined refractive index profile of the core is provided by controlling parameters of the core soot stream;

b) reciprocally applying along the longitudinal axis of the core of a radial cladding soot stream having a prospecified temperature to deposit a cladding soot material layer upon the core until the cladding ratio "t/a" reaches a predetermined value, where "t" is the thickness of the cladding layer, wherein the density of the deposited cladding soot material is maintained substantially constant to form an article; and c) drying and sintering the article formed in step (b) to provide a vitreous preform capable of being drawn into optical waveguides.

11. The method of claim 10 further comprising the steps of: drawing the vitreous preform to a predetermined diameter; depositing radially a second cladding material layer of a predetermined thickness thereon to form a product; and sintering and drawing the product thus formed into a waveguide having a predetermined diameter.

12. The method of claim 10 wherein the density of the deposited cladding material is maintained substantially constant by incrementally increasing the temperature of the cladding soot stream as the cladding material deposit grows.

13. The method of claim 10 wherein the predetermined value of the cladding ratio "t/a" is between about 1 and about 26.

14. The method of claim 10 wherein the free end of the core has a geometric center, the soot core stream is directed upward at an angle of at least about 60° with respect to the longitudinal axis of the core, and the soot core stream is laterally and vertically offset from the geometric center of the core.

15. The method of claim 14 wherein the angle between the soot stream and the longitudinal axis of the core is about 65°.

16. The method of claim 10 wherein the deposition rate of the core is controlled by changing the distance "d" between the geometric center of the core free end and a point which is defined as an intersection of the center of the core soot stream with the longitudinal axis of the core.

17. The method of claim 10 wherein the free end of the core has a geometric center, and the soot core stream is laterally and vertically offset from the geometric center of the core and wherein the controlling of the parameters of the soot stream comprises varying the lateral offset of the center of the core soot stream relative to the geometric center of the core so that lower values of the lateral offset result in a refractive index profile showing highest value at the geometric center of the core.

18. The method of claim 10 wherein the free end of the core has a geometric center, and the soot core stream is laterally and vertically offset from the geometric center of the core and wherein the refractive index profile of the core is controlled by varying the lateral offset of the center of the core soot stream relative to the geometric center of the core so that higher values of the lateral offset result in a refractive index profile showing higher values near the edges of the core.

19. The method of claim 10, wherein the free end of the core has a geometric center, and the soot core stream is laterally and vertically offset from the geometric center of the core and wherein a substantially constant value of the refractive index profile is obtained by using a lateral offset of about 0.3 cm.

20. The method of claim 10 wherein the core soot stream has controllable temperature and the predetermined refractive index profile is provided by controlling the temperature of the core soot stream so that lower values of the soot stream temperature result in a refractive index profile showing highest value at the geometric center of the core.

21. The method of claim 10 wherein the core soot stream has controllable temperature and the predetermined refractive index profile is provided by controlling the temperature of the core soot stream so that higher values of the soot stream temperature result in a refractive index profile showing higher values near the edges of the core.

22. The method of claim 10 wherein the predetermined refractive index profile of the core is graded.

23. The method of claim 10 wherein the predetermined refractive index profile of the core is constant.

24. The method of claim 23 wherein the core soot includes a dopant and the method, prior to step (b), includes the step of depositing of an interface layer of cladding material onto the core to minimize dopant boiloff and improve a cutoff characteristic of the refractive index profile at an interface between the core and the cladding.

25. The method of claim 24 wherein the refractive index profile at the interface between the core and the cladding approximates a step function.

26. The method of claim 10 wherein the refractive index profile at the interface between the core and the cladding is controlled by including a dopant in the core soot stream.

27. A method of fabricating an optical waveguide having a predetermined refractive index profile comprising the steps of:

a) building upon a rotating bait rod a core having a longitudinal axis, a free end positioned away from said bait rod, a substantially constant radius "a", and a predetermined refractive index profile by: (1) directing a confined core soot stream with a cross-section substantially uniform along its path onto the free end of the core to deposit core soot material thereupon; and (2) modifying the position of the core soot stream relative to the core to maintain a controllable deposition rate of said core soot material on the core;

wherein the predetermined refractive index profile of the core is provided by including a dopant in the core soot stream;

b) applying along the longitudinal axis of the core a radial cladding soot stream having a pre-specified temperature to deposit a cladding soot material layer upon the core until the cladding ratio "t/a" reaches a predetermined value, where "t" is the thickness of the cladding layer, wherein the density of the deposited cladding soot material is maintained substantially constant by incrementally increasing the temperature of the cladding soot stream as the cladding material deposit grows to form an article;

c) drying and sintering the article formed in step (c) to provide a vitreous preform capable of being drawn into optical waveguides;

d) drawing the vitreous preform to a predetermined diameter;

e) depositing radially a second cladding material layer of a predetermined thickness thereon to form a product; and f) sintering and drawing the product thus formed into a waveguide having a predetermined diameter.

* * * * *